US010365406B2

United States Patent
Springer

(10) Patent No.: US 10,365,406 B2
(45) Date of Patent: *Jul. 30, 2019

(54) USER EQUIPMENT LOCAL BAROMETRIC CALIBRATION

(71) Applicant: AT&T Intellectual Property I, L.P., Atlanta, GA (US)

(72) Inventor: Kelly Springer, Edmonds, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,945

(22) Filed: Apr. 23, 2018

(65) Prior Publication Data
US 2018/0246255 A1 Aug. 30, 2018

Related U.S. Application Data

(63) Continuation of application No. 14/852,042, filed on Sep. 11, 2015, now Pat. No. 9,952,354.

(51) Int. Cl.
*G01W 1/18* (2006.01)
*G01L 27/00* (2006.01)
(Continued)

(52) U.S. Cl.
CPC ............ *G01W 1/18* (2013.01); *G01L 27/002* (2013.01); *H04W 4/023* (2013.01); *H04W 8/245* (2013.01); *H04W 48/16* (2013.01)

(58) Field of Classification Search
CPC ...... G01W 1/18; G01L 27/002; H04W 4/023; H04W 8/245; H04W 48/16
(Continued)

(56) References Cited

U.S. PATENT DOCUMENTS 6,518,918 B1  2/2003  Vannucci et al.
6,882,308 B2  4/2005  Farine et al.
(Continued)

FOREIGN PATENT DOCUMENTS

GB     2357582      6/2001
JP  2004045274      2/2004
(Continued)

OTHER PUBLICATIONS https://opendap.co-ops.nos.noaa.gov/axis/webservices/barometricpressure/index.jsp; all pages. (Year: 2017).*
(Continued)

*Primary Examiner* — Fernando Hidalgo
(74) *Attorney, Agent, or Firm* — Akerman LLP; Michael K. Dixon; Mammen (Roy) P. Zachariah, Jr.

(57) ABSTRACT

A system for providing local barometric calibration for user equipment is disclosed. In particular, the system may utilize an over-the-air signal to feed local barometric pressure measurements to the user equipment so as to auto-calibrate the barometric sensor of the user equipment to the local barometric pressure. The local barometric pressure may be collated to the serving cell site identifier or wireless access point to which the user equipment is connected. The local barometric pressure measurements may be obtained by the optimal resource available in the area associated with the user equipment. For example, the local barometric pressure measurements may be obtained from the Internet, a local weather service, a local serving beacon, or other source. The barometric sensor may be calibrated at desired intervals, when certain conditions are satisfied, or any combination thereof.

20 Claims, 3 Drawing Sheets

(51) Int. Cl.
*H04W 48/16* (2009.01)
*H04W 4/02* (2018.01)
*H04W 8/24* (2009.01)

(58) Field of Classification Search
USPC .......................................................... 702/98
See application file for complete search history.

(56) References Cited

U.S. PATENT DOCUMENTS

| | | | |
|---|---|---|---|
| 7,263,442 B2 | 8/2007 | Eckel | |
| 7,289,929 B2 | 10/2007 | Makela et al. | |
| 7,428,466 B2 | 9/2008 | Makela et al. | |
| 7,558,671 B2 | 7/2009 | Dossas et al. | |
| 8,712,713 B2 | 4/2014 | Wolf | |
| 8,935,119 B2 | 1/2015 | Yuen | |
| 8,952,818 B1 * | 2/2015 | Zhang | G08B 21/0446 340/573.1 |
| 8,972,180 B1 | 3/2015 | Zhao et al. | |
| 2011/0199257 A1 | 8/2011 | Lundgren et al. | |
| 2013/0132017 A1 | 5/2013 | Hiltunen et al. | |
| 2013/0133421 A1 | 5/2013 | Katz | |
| 2013/0257650 A1 | 10/2013 | Miyake | |
| 2014/0102169 A1 | 4/2014 | Yoneyama | |
| 2014/0135040 A1 | 5/2014 | Edge et al. | |
| 2016/0033286 A1 * | 2/2016 | Gemelli | H04W 76/10 701/467 |

FOREIGN PATENT DOCUMENTS

| | | |
|---|---|---|
| WO | 2006134500 | 12/2006 |
| WO | 2014150693 | 9/2014 |
| WO | 2014202111 | 12/2014 |
| WO | 2015088628 | 6/2015 |

OTHER PUBLICATIONS www.noaa.gov ("NOAA"), all pages. (Year: 2015).*
James et al., "GSM Based Multi node Pressure Sensor in Barometric Altimeter—A survey," International Journal of Scientific & Engineering Research, vol. 2, Issue 11, Nov. 2011, 1-5.
Manikandan et al., "Micro Electro Mechanical System (MEMS) based pressure sensor in barometric altimeter," International Journal of Scientific & Engineering Research, vol. 2, Issue 8, Aug. 2011, 1-8.
Martinez-Benjamin et al., "Ibiza absolute calibration experiment: survey and preliminary results," Marine geodesy 27.3-4 (2004): 657-681.
Li et al., "Using barometers to determine the height for indoor positioning," Indoor Positioning and Indoor Navigation (IPIN), 2013 International Conference, IEEE, 2013.
Falk et al., "Using automatic dependent surveillance-broadcast data for monitoring aircraft altimetry system error," Proceedings of the AIAA guidance, navigation, and control conference, 2010.

* cited by examiner

USER EQUIPMENT LOCAL BAROMETRIC CALIBRATION

CROSS-REFERENCE TO RELATED APPLICATION

This application is a continuation of and claims priority to U.S. patent application Ser. No. 14/852,042, filed on Sep. 11, 2015, which is hereby incorporated by reference in its entirety.

FIELD OF THE INVENTION

The present application relates to technologies for barometric calibration, barometric sensors, and more particularly, to a system and method for providing local barometric calibration for user equipment.

BACKGROUND

In today's society, users and organizations are increasingly utilizing smartphones and other user equipment to gain access to the Internet, request and access various types of content, access software applications, access software services, access large volumes of data, and perform a variety of other tasks and functions. Currently, certain smartphones and user equipment include barometric pressure sensors that are attached to or embedded within the smartphones and user equipment. Such barometric pressure sensors are typically calibrated by the manufacturers of the barometric pressure sensors at sea level and then sent to the market for sale. As the number of smartphones and user equipment containing barometric pressure sensors has increased, users and organizations have started to use such barometric pressure sensors in conjunction with various types of software applications, such as, but not limited to mapping applications and tracking applications.

Nevertheless, testing has shown that barometric pressure sensors are often not calibrated to the proper local barometric pressure, and are often not calibrated or tested by each manufacturer in the same manner. Since such barometric pressure sensors are often not calibrated to the proper local barometric pressure, the barometric pressure sensors often report barometric pressure measurements that have errors of fifty feet or greater. In some cases, the barometric pressure sensors may report barometric pressure measurements including errors as high as several hundred feet or greater. While enabling a user to manually set the barometric pressure sensors to the local barometric pressure readings may be feasible, the local barometric pressure may change dramatically as local weather conditions change.

SUMMARY

A system and accompanying methods for providing local barometric calibration for user equipment, such as a communication device, are disclosed. In particular, the system and methods may involve utilizing an over-the-air signal to feed local barometric pressure measurements to the user equipment so as to auto-calibrate a barometric sensor of the user equipment to the local barometric pressure. In order to accomplish the foregoing, the system and methods may involve identifying a cell site identifier associated with a cell site connected to the communication device and/or identifying a wireless access point connected to the communication device. Based on the identification of the cell site identifier, the cell site, the wireless access point, or any combination thereof, the system and methods may include determining a source for providing a barometric pressure measurement corresponding to the current location of the communication device. For example, the source for providing the barometric pressure measurement may include, but is not limited to, a National Oceanic and Atmospheric Administration (NOAA) transmitter, a local weather transmitter, a barometric pressure beacon, the internet, any source of barometric pressure measurements, or any combination thereof.

After determining the source for providing the barometric pressure measurement corresponding to the current location of the communication device, the system and methods may include receiving, via an over-the-air signal provided by the source, the barometric pressure measurement corresponding to the location of the communication device. Once the barometric pressure measurement is received, the system and methods may include transmitting the barometric pressure measurement to the barometric sensor of the communication device. The barometric sensor of the communication device may then be calibrated based on the barometric pressure measurement corresponding to the current location of the communication device. In certain embodiments, the barometric sensor may be calibrated at desired intervals, when certain conditions are satisfied, or any combination thereof. Additionally, the system and methods are not limited to calibrating barometric sensors or to obtaining barometric pressure measurements. Notably, the system and methods may be utilized to calibrate any type of sensor, component, program, or any combination thereof, that is associated with a communication device. For example, the system and methods may be utilized to calibrate temperature sensors, proximity sensors, motion sensors, accelerometers, light sensors, gyroscopes, compasses, or any combination thereof.

In one embodiment, a system for providing local barometric calibration for user equipment is disclosed. The system may include a memory that stores instructions and a processor that executes the instructions to perform various operations of the system. The system may perform an operation that includes identifying a cell site identifier associated with a cell site connected to user equipment, such as a communication device. The system may then perform an operation that includes determining, based on the cell site identifier and the cell site, a source for providing a barometric pressure measurement corresponding to a location of the communication device. Additionally, the system may perform an operation that includes receiving, via an over-the-air signal provided by the source, the barometric pressure measurement corresponding to the location of the communication device. Furthermore, the system may perform an operation that includes transmitting, to a barometric sensor of the communication device, the barometric pressure measurement corresponding to the location of the communication device. Moreover, the system may perform an operation that includes calibrating the barometric sensor based on the barometric pressure measurement corresponding to the location of the communication device.

In another embodiment, a method for providing local barometric calibration for user equipment is disclosed. The method may include utilizing a memory that stores instructions, and a processor that executes the instructions to perform the various functions of the method. The method may include identifying a cell site identifier associated with a cell site connected to a communication device. Additionally, the method may include determining, based on the cell site identifier and the cell site, a source for providing a barometric pressure measurement corresponding to a location of the communication device. The method may also include receiving, via an over-the-air signal provided by the source, the barometric pressure measurement corresponding to the location of the communication device. Furthermore, the method may include transmitting, to a barometric sensor of the communication device, the barometric pressure measurement corresponding to the location of the communication device. Moreover, the method may include calibrating the barometric sensor based on the barometric pressure measurement corresponding to the location of the communication device.

According to yet another embodiment, a computer-readable device having instructions for providing local barometric calibration for user equipment is provided. The computer instructions, which when loaded and executed by a processor, may cause the processor to perform operations including: identifying a cell site identifier associated with a cell site connected to a communication device; determining, based on the cell site identifier and the cell site, a source for providing a barometric pressure measurement corresponding to a location of the communication device; receiving, via an over-the-air signal provided by the source, the barometric pressure measurement corresponding to the location of the communication device; transmitting, to a barometric sensor of the communication device, the barometric pressure measurement corresponding to the location of the communication device; and calibrating the barometric sensor based on the barometric pressure measurement corresponding to the location of the communication device.

These and other features of the systems and methods for providing local barometric calibration for user equipment are described in the following detailed description, drawings, and appended claims.

DETAILED DESCRIPTION OF THE INVENTION

Figure 1:
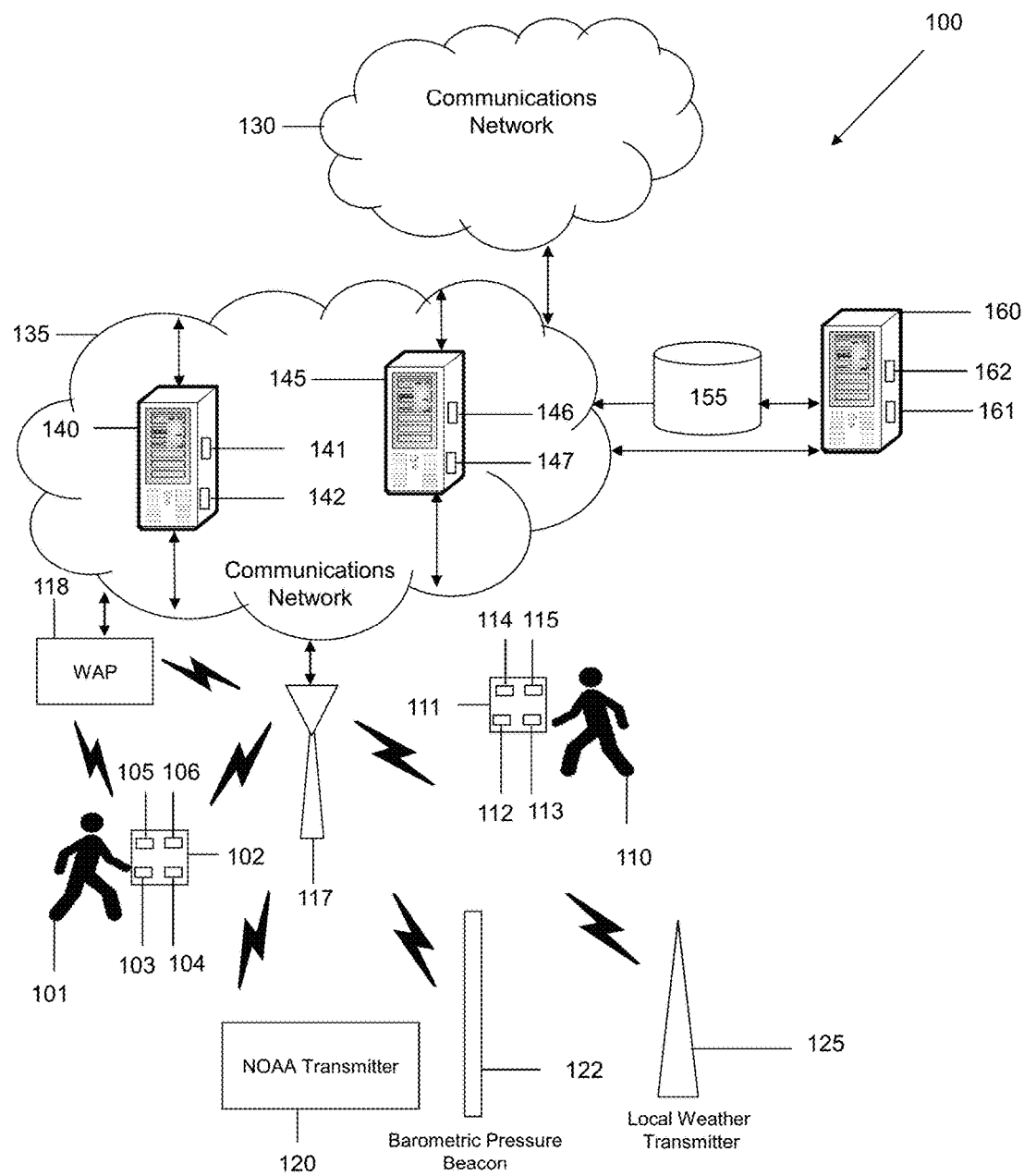
FIG. 1 is a schematic diagram of a system for providing local barometric calibration for user equipment according to an embodiment of the present disclosure.

A system 100 and accompanying methods for providing local barometric calibration for user equipment, such as a communication device, are disclosed. In particular, the system 100 and methods may involve utilizing an over-the-air signal to feed local barometric pressure measurements to the user equipment so as to auto-calibrate a barometric sensor of the user equipment to the local barometric pressure. In order to accomplish the foregoing, the system 100 and methods may involve identifying a cell site identifier associated with a cell site 117 connected to the communication device and/or identifying a wireless access point 118 connected to the communication device. Based on the identification of the cell site identifier, the cell site 117, the wireless access point 118, or any combination thereof, the system 100 and methods may include determining a source for providing a barometric pressure measurement corresponding to the current location of the communication device. For example, the source for providing the barometric pressure measurement may include, but is not limited to, a NOAA transmitter 120, a local weather transmitter 125, a barometric pressure beacon 122, a communications network 130, any source of barometric pressure measurements, or any combination thereof.

After determining the source for providing the barometric pressure measurement corresponding to the current location of the communication device, the system 100 and methods may include receiving, via an over-the-air signal provided by the source, the barometric pressure measurement corresponding to the location of the communication device. Once the barometric pressure measurement is received, the system 100 and methods may include transmitting the barometric pressure measurement to the barometric sensor (e.g. barometric sensors 105, 114) of the communication device. The barometric sensor of the communication device may then be calibrated based on the barometric pressure measurement corresponding to the current location of the communication device. In certain embodiments, the barometric sensor may be calibrated at desired intervals, when certain conditions are satisfied, or any combination thereof. Additionally, the system 100 and methods are not limited to calibrating barometric sensors or to obtaining barometric pressure measurements. Notably, the system 100 and methods may be utilized to calibrate any type of sensor, component, program, or any combination thereof, that is associated with a communication device. For example, the system 100 and methods may be utilized to calibrate temperature sensors, proximity sensors, motion sensors, accelerometers, light sensors, gyroscopes, compasses, or any combination thereof.

As shown in FIG. 1, a system 100 for providing local barometric calibration for user equipment is disclosed. The system 100 may be configured to support, but is not limited to supporting, cloud computing services, content delivery services, satellite services, telephone services, voice-over-internet protocol services (VoIP), software as a service (SaaS) applications, gaming applications and services, productivity applications and services, mobile applications and services, and any other computing applications and services. The system may include a first user 101 that may utilize a first user device 102 to access data, content, and services, or to perform a variety of other tasks and functions. As an example, the first user 101 may utilize first user device 102 to transmit signals to access various online services, such as those provided by a content provider or service provider associated with communications network 135. The first user device 102 may include a memory 103 that includes instructions, and a processor 104 that executes the instructions from the memory 103 to perform the various operations that are performed by the first user device 102. The processor 104 may be hardware, software, or a combination thereof.

The first user device 102 may also include a barometric sensor 105. The barometric sensor 105 may be a pressure sensor that may be configured to measure fluctuations in the pressure exerted by the atmosphere, and may be utilized by one or more components and/or applications of the first user device 102. In certain embodiments, the barometric sensor 105 may be embedded within a chipset of the first user device 102, however, in other embodiments, the barometric sensor 105 may be located anywhere within or in proximity to the first user device 102. Furthermore, the first user device 102 may include a component 106, which may be any type of sensor, component, program, or any combination thereof, associated with a communication device. In certain embodiments, the component 106 may be a temperature sensor, proximity sensor, motion sensor, accelerometer, light sensor, gyroscope, compass, any type of component, or any combination thereof. In certain embodiments, the first user device 102 may be a computer, a laptop, a tablet device, a phablet, a server, a mobile device, a smartphone, a smart watch, or any other type of computing device. Illustratively, the first user device 102 is shown as a smartphone device in FIG. 1.

In addition to the first user 101, the system 100 may also include a second user 110 that may utilize a second user device 111 to also access data, content, and services, and to perform a variety of other functions. For example, the second user device 111 may be utilized by the second user 110 to transmit signals to request various types of content, services, and data provided by providers associated with communications network 135 or communications network 130. The second user device 111 may include a memory 112 that includes instructions, and a processor 113 that executes the instructions from the memory 112 to perform the various operations that are performed by the second user device 111. The processor 113 may be hardware, software, or a combination thereof.

Similar to the first user device 102, the second user device 111 may also include a barometric sensor 114. The barometric sensor 114 may similarly be a pressure sensor that may be configured to measure fluctuations in the pressure exerted by the atmosphere, and may be utilized by one or more components and/or applications of the second user device 102 for various purposes. In certain embodiments, the barometric sensor 114 may be embedded within a chipset of the second user device 111, however, in other embodiments, the barometric sensor 114 may be located anywhere within or in proximity to the second user device 111. Furthermore, the second user device 111 may include a component 115, which may be any type of sensor, component, program, or any combination thereof, associated with a communication device. In certain embodiments, the component 115 be a temperature sensor, proximity sensor, motion sensor, accelerometer, light sensor, gyroscope, compass, any type of component, or any combination thereof. In certain embodiments, the second user device 111 may be a computer, a laptop, a tablet device, a phablet, a server, a mobile device, a smartphone, a smart watch, or any other type of computing device. Illustratively, the second user device 111 is shown as a smartphone device in FIG. 1.

In certain embodiments, first user device 102 and the second user device 111 may have any number of software applications stored and/or accessible thereon. For example, the first and second user devices 102, 111 may include cloud-based applications, mapping applications, location tracking applications, applications that gather crowdsourcing information, database applications, gaming applications, internet-based applications, browser applications, mobile applications, service-based applications, productivity applications, video applications, music applications, streaming media applications, social media applications, any other type of applications, or a combination thereof. In certain embodiments, the software applications may include one or more graphical user interfaces so as to enable the first and second users 101, 110 to readily interact with the software applications. The software applications may also be utilized by the first and second users 101, 110 to interact with the any device in the system 100, any network in the system 100, or any combination thereof.

The system 100 may also include a transmitter 120, which may be a NOAA transmitter or any other type of transmitter that may serve as a source of information, such as, but not limited to, weather-related information. In certain embodiments, the transmitter 120 may be a radio station, a computing device, any type of transmitter, or any combination thereof, and may be configured to communicate with any of the devices in the system 100. The transmitter 120 may be configured to acquire and transmit any type of information including, but not limited to, current sky conditions, temperature measurements, dew points, humidity readings, wind speed measurements, wind directions, barometric pressure measurements, rain conditions, any precipitation conditions, any type of weather conditions, any type of air conditions, any type of ocean or water conditions, any type of land conditions, or any combination thereof. In certain embodiments, the transmitter 120 may transmit signals, such as, but not limited to, over-the-air signals to the first and second user devices 102, 111, to any other device in the system 100, any of the communication networks 130, 135, or any combination thereof. Additionally, the signals may be sent or received at any selected frequency and at any desired rate.

The system 100 may additionally include a barometric pressure beacon 122, which may communicate with any of the devices in the system 100. The barometric pressure beacon 122 may be a beacon that is configured to obtain and transmit barometric pressure information, temperature measurements, weather condition information, wind speed and direction measurements, or any combination thereof. In certain embodiments, the barometric pressure beacon 122 may be configured to transmit signals, such as, but not limited to, over-the-air signals, to the first and second user devices 102, 111, to any other device in the system 100, any of the communication networks 130, 135, or any combination thereof. Additionally, the barometric pressure beacon 122 may be configured to receive signals from any of the devices in the system 100, any of the communication networks 130, 135, or any combination thereof. In certain embodiments, the signals may be sent or received at any selected frequency and at any desired rate.

In addition to including the transmitter 120 and the barometric pressure beacon 122, the system 100 may also include a local weather transmitter 125. The local weather transmitter 125 may be local to the first and second users 101, 110, any of the devices in the system 100, any of the communication networks 130, 135, or any combination thereof. Additionally, the local weather transmitter 125 may be configured to obtain and transmit barometric pressure measurements, temperature measurements, weather condition information, humidity readings, wind speed measurements, wind direction information, precipitation information, or any combination thereof. In certain embodiments, the local weather transmitter 125 may be configured to transmit signals, such as, but not limited to, over-the-air signals, to the first and second user devices 102, 111, to any other device in the system 100, to any of the communication networks 130, 135, or any combination thereof. Additionally, the barometric pressure beacon 122 may be configured to receive signals from any of the devices in the system 100, any of the communication networks 130, 135, or any combination thereof. In certain embodiments, the signals may be sent or received at any selected frequency and at any desired rate.

The communications network 130 of the system 100 may be configured to link with each of the devices in the system 100 to one another, and be configured to transmit, generate, and receive any information and data traversing the system 100. In one embodiment, the communications network 130 may include any number of servers, databases, or other componentry. In certain embodiments, the communications network 130 may be configured to communicatively link with the first user device 102, the second user device 111, the cell site 117, the wireless access point 118, the transmitter 120, the barometric pressure beacon 122, the local weather transmitter 125, the communications network 135, the server 140, the server 145, the database 155, the server 160, or any combination thereof. The communications network 130 may also include and be connected to a cloud-computing network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, the communications network 130 is shown as including the Internet. In certain embodiments, the communications network 130 may be part of a single autonomous system that is located in a particular geographic region, or be part of multiple autonomous systems that span several geographic regions.

In addition to communications network 130, the system 100 may also include a communications network 135. The communications network 135 of the system 100 may be configured to link each of the devices in the system 100 to one another, and be configured to transmit, generate, and receive any information and data traversing the system 100. In one embodiment, the communications network 135 may include any number of servers, databases, or other componentry. The communications network 135 may be configured to communicatively link with the first user device 102, the second user device 111, the cell site 117, the wireless access point 118, the transmitter 120, the barometric pressure beacon 122, the local weather transmitter 125, the communications network 130, the server 140, the server 145, the database 155, the server 160, or any combination thereof. The communications network 135 may also include and be connected to a cloud-computing network, a wireless network, an Ethernet network, a satellite network, a broadband network, a cellular network, a private network, a cable network, the Internet, an internet protocol network, a multiprotocol label switching (MPLS) network, a content distribution network, any network or any combination thereof. Illustratively, servers 140 and 145 are shown as being included within communications network 135, and the communications network 135 is shown as a mobile wireless network.

In certain embodiments, the communications network 135 may communicate with the first and second user devices 102, 111 via the cell site 117, the wireless access point 118, or any combination thereof. The cell site 117 may be a cellular tower that includes antennae and electronics communications equipment that may be utilized to create a cell for the communications network 135. Each cell site 117 may include an identifier that is utilized to identify the cell site to any of the networks, devices, and programs in the system 100. The identifier may be a sequence of numbers, characters, or any combination thereof that uniquely identify the cell site 117. In certain embodiments, the cell site 117 may be a base station or other similar station, and may be configured to connect with the first and second user devices 102, 111. In certain embodiments, the cell site 117 may include any of the functionality and features of any type of cell site or tower. In certain embodiments, the first and second user devices 102, 111 may connect with the communications network 135 via the wireless access point 118, which may be a device that enables the first and second user devices 102, 111 to connect to the communications network 135 using Wi-Fi or other communication standards. In certain embodiments, the wireless access point 118 may serve as a transmitter and receiver of wireless radio signals occurring between the first and second user devices 102, 111 and the communications network 135. In certain embodiments, the wireless access point 118 may include any of the functionality of any type of wireless access point. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 130, the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to servers 140, 145, 160, the first user device 102, the second user device 111, the transmitter 120, the barometric pressure beacon 122, the local weather transmitter 125, the communications network 130, or any combination thereof.

The database 155 may also store information and metadata obtained from the system 100, store metadata and other information associated with the first and second users 101, 110, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information obtained from the transmitter 120, the barometric pressure beacon 122, the local weather transmitter 125, or any combination thereof, store barometric pressure information, store weather condition information, store conditions for calibrating the barometric sensors 105, 114 and the components 106, 115, store any information traversing the system 100, or any combination thereof. Furthermore, the database 155 may be configured to process queries sent to it by any device in the system 100.

Operatively, the system 100 may provide for local barometric calibration for user equipment in the following exemplary manner. In a sample scenario, the first user 101 may be utilizing first user device 102, which may be a smartphone or other similar device. The first user 101 may be located on floor 55 of a high-rise building with many floors, and may be utilizing a mapping application executing on the first user device 102. When the first user 101 opens the mapping application or at any other desired time, the system 100 may be configured to identify a cell site identifier associated with the cell site 117 that the first user device 102 is connected to and/or identify a wireless access point 118 that the first user device 102 is connected to. Based on the cell site identifier and/or the identification of the wireless access point 118, the system 100 may determine a source for providing a barometric pressure measurement corresponding to the current location of the first user device 102. The source, for example, may be a transmitter 120, a barometric pressure beacon 122, the local weather transmitter 125, the communications networks 130, 135, or any combination thereof.

Once the source is determined, the first user device 102 may receive, such as via an over-the-air signal provided by the determined source, the barometric pressure measurement corresponding to the current location of the first user device 102. The first user device 102 may then transmit the barometric pressure measurement to the barometric sensor 105 of the first user device 102 and calibrate the barometric sensor 105 based on the barometric pressure measurement. Once calibrated, the barometric sensor 105 may provide accurate barometric pressure readings that actually correspond to the actual location of the first user device 102. The barometric pressure readings may be provided to the mapping application, which may map altitude information obtained from the barometric pressure readings to the building floor layout of the building that the first user 101 is located in to determine that the first user 101 and first user device 102 are located on floor 55. The mapping application and the first user device 102 may then have accurate location and altitude information for the first user 101 and the first user device 102.

The location information may then be provided to another application, another individual, another device, or any combination thereof. For example, the location information may be provided to second user device 111, who may be using a similar mapping application. The second user 110 may access the mapping application and receive the location information that identifies the location of the first user device 102. The second user device 111 may then display the accurate location of the first user 101 and the first user device 102 in the building on the mapping application of the second user 110. For example, a graphical user interface of the mapping application may be displayed on the second user device 111, which shows the specific floor and room that the first user 101 and the first user device 102 are located on. As the first user 101 and the first user device 102 move to a new location and/or local weather conditions change, new barometric pressure measurements corresponding to the new locations and/or local weather conditions may be received from the appropriate sources. The new barometric pressure measurements may then be utilized to recalibrate the barometric sensor 105 of the first user device 102. The recalibrated barometric sensor 105 may then share the updated information with any device, program, or individual.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, identifying cell site identifiers and/or wireless access points 118, determining a source for providing barometric pressure measurements or other information, receiving signals including barometric pressure measurements or other information, transmitting the barometric pressure measurements or other information, determining if a location of a communication device has changed, determining if conditions local to the communication device have changed, calibrating barometric sensors 105, 114, calibrating components 106, 115, recalibrating barometric sensors 105, 114 and components 106, 115, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a cell site 117, a wireless access point 118, a transmitter 120, a barometric pressure beacon 122, a local weather transmitter 125, a communications network 130, a communications network 135, a server 140, a server 145, a server 160, and a database 155. However, the system 100 may include multiple first user devices 102, multiple second user devices 111, multiple cell sites 117, multiple wireless access points 118, multiple transmitters 120, multiple barometric pressure beacons 122, multiple local weather transmitters 125, multiple communication networks 130, multiple communications networks 135, multiple servers 140, multiple servers 145, multiple servers 160, multiple databases 155, or any number of any of the other components in the system 100. Furthermore, in certain embodiments, substantial portions of the functionality and operations of the system 100 may be performed by other networks and systems that may be connected to system 100.

Figure 2:
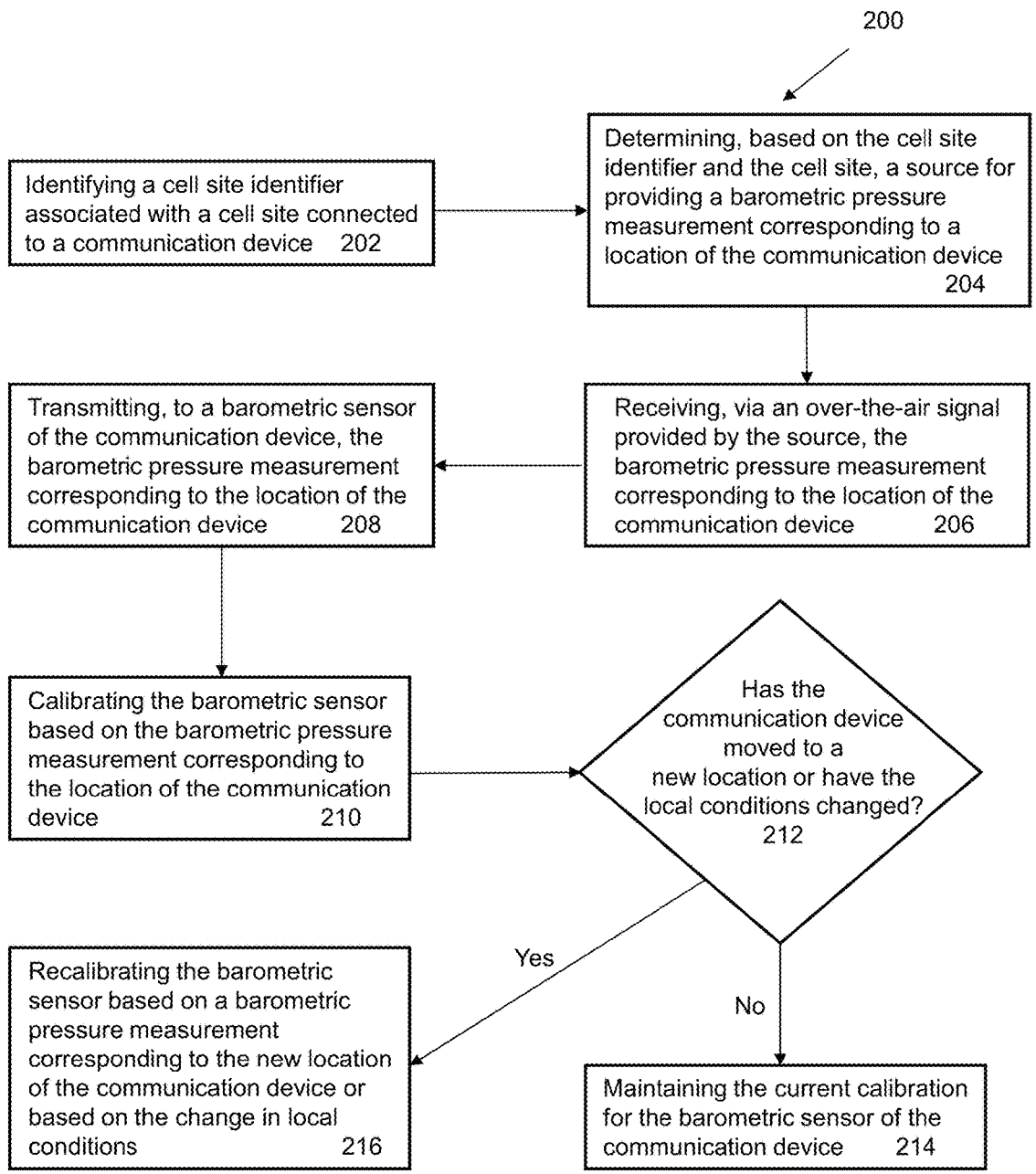
FIG. 2 is a flow diagram illustrating a sample method for providing local barometric calibration for user equipment according to an embodiment of the present disclosure.

As shown in FIG. 2, an exemplary method 200 for providing local barometric calibration for user equipment is schematically illustrated, and may include, at step 202, identifying a wireless access point 118 and/or a cell site identifier associated with a cell site 117 connected to a communication device, such as first user device 102 or second user device 111. In certain embodiments, the identifying may be performed by utilizing the first user device 102, the second user device 111, the cell site 117, the wireless access point 118, the server 140, the server 145, the server 160, any combination thereof, or by utilizing any other appropriate program, system, or device. At step 204, the method 200 may include determining, based on the cell site identifier, the cell site 117, the wireless access point 118, or any combination thereof, a source for providing a barometric pressure measurement corresponding to a location of the communication device. In certain embodiments, the determining may be performed by utilizing the cell site 117, the wireless access point 118, the server 140, the server 145, the server 160, any combination thereof, or by utilizing any other appropriate program, system, or device.

Once the source is determined, the method 200 may include, at step 206, receiving, such as via an over-the-air signal provided by the source, the barometric pressure measurement corresponding to the location of the communication device. In certain embodiments, the receiving may be performed by utilizing the first user device 102, the second user device 111, the cell site 117, the wireless access point 118, the server 140, the server 145, the server 160, any combination thereof, or by utilizing any other appropriate program, system, or device. At step 208, the method 200 may include transmitting, such as to a barometric sensor 105, 114 of the communication device, the barometric pressure measurement corresponding to the location of the communication device. In certain embodiments, the transmitting may be performed by utilizing the first user device 102, the second user device 111, any of the componentry of the first and second user devices 102, 111, the cell site 117, the wireless access point 118, the server 140, the server 145, the server 160, any combination thereof, or by utilizing any other appropriate program, system, or device.

At step 210, the method 200 may include calibrating the barometric sensor 105, 114 of the communication device based on the barometric pressure measurement corresponding to the location of the communication device. In certain embodiments, the calibrating may be performed by utilizing the first user device 102, the second user device 111, the barometric sensors 105, 114, or by utilizing any other appropriate program, system, or device. At step 212, the method 200 may include determining if the communication device has moved to a new location and/or if the local conditions (e.g. weather conditions, atmospheric conditions) have changed. If the local conditions have not changed and the communication device has not moved to a new location, the method 200 may include, at step 214, maintaining the current calibration for the barometric sensor 105, 114 of the communication device. In certain embodiments, the maintaining may be performed by utilizing the first user device 102, the second user device 111, the barometric sensors 105, 114, or by utilizing any other appropriate program, system, or device. If, however, the communication device has moved, the local conditions have changed, or both, the method 200 may include, at step 216, recalibrating the barometric sensor 105, 114 based on barometric pressure measurements that correspond to the new location and/or the new local conditions. In certain embodiments, the recalibrating may be performed by utilizing the first user device 102, the second user device 111, the barometric sensors 105, 114, or by utilizing any other appropriate program, system, or device. Notably, the method 200 may incorporate any of the features and functionality described for the system 100 or as otherwise described herein.

Notably, the systems and methods disclosed herein may include additional functionality and features. For example, the system 100 and methods may be configured to enable the first user device 102 and the second user device 111 obtain the correct barometric pressure measurements or other measurements from the appropriate source. For example, the system 100 may determine the optimal source for providing the measurements based on a particular source's proximity to the first and second user devices 102, 111, based on how recently the measurements have been obtained by a particular source, based on the storage capacity of a particular source, based on the processing power of a particular source, based on the signal strength of a particular source, based on whether the source is transmitting information to other communication devices, based on the load of a particular source, based on a particular source's connection with the communication networks 130, 135, based on any combination thereof, or based on any other types of factors.

Additionally, the systems and methods may include enabling the barometric pressure measurements utilized by the barometric sensors 104, 115 to be utilized by any type of software application, device, or any combination thereof. For example, the barometric pressure measurements may be utilized by an application of the first user device 102 to determine critical altitude location information for the first user device 102 and the first user 101. The altitude information may be mapped to a building floor layout of a building that the first user 101 is located in. Once the altitude information is mapped to the building floor layout, the information may be utilized, for example, to provide lifesaving location data to first responders that have been made aware of an emergency associated with the first user 101. The first responders may be able to determine which floor in the building the first user 101 is located on based on the information provided by the calibrated barometric sensor 104. As a result, the systems and methods may be useful in facilitating various types of emergency services, such as but not limited to, public safety E911 and determining the identity and location of an E911 caller.

Furthermore, the systems and methods may include allow for the tracking of objects, such as, but not limited to, packages, personal possessions, pets, or any combination thereof. As an example, a commercial delivery company may be able to track the specific location of a package within a building, such as by floor, by utilizing the barometric pressure measurements, weather condition measurements, and any other measurements. The package may be tracked by having a barometric sensor 104, 115 on the package itself, by being in proximity to a device including the barometric sensor 104, 115 (e.g. first user device 102), or by including componentry that is capable of receiving barometric pressure information, weather condition information, or any combination thereof. Also, the systems and methods may be utilized in conjunction with home automation applications and devices, particularly in the context of multi-floor buildings, large buildings, or a combination thereof. For example, the systems and methods may be utilized with smart lights, motion sensors, smart locks, smart sound systems, geofencing applications, crowdsourcing applications, smart appliances, smart thermostats, or any combination thereof. In an exemplary scenario, if the first user device 102 is detected as being located within a certain range of the first user's home, the system 100 may automatically turn on the smart lights, activate the thermostat, turn off/on a speaker, lock/unlock the front door, or perform any other operations associated with home automation devices.

In certain embodiments, the systems and methods may include allowing the barometric sensors 105, 114 and the components 106, 115 to be calibrated and updated on a periodic interval, in real-time, at a selected time interval, on the fly, or at any other desired rate. The time interval may be adjustable. In certain embodiments, the calibrations may be performed when the first and second users' 101, 110 initiate a particular application, terminate a particular application, utilize a voice command, utilize certain detectable gestures, input certain numeric or other codes, or any combination thereof. In certain embodiments, the calibrations and/or recalibrations may be performed upon the satisfaction of any desired condition. In certain embodiments, the barometric information, weather information, or any other information disclosed herein or otherwise, may be downloaded to the first and second user devices 102, 111 by way of a push or by way of a direct request from the first and second user devices 102, 111. In certain embodiments, if the first and second user devices 102, 111 are directly requesting the information, the requests may be sent via the signaling utilized for wireless access to the communication networks 130, 135. In certain embodiments, the barometric sensors 105, 114, and the components 106, 115 may be calibrated manually by the first and second users 101, 110 at a periodic time interval or any other desired time interval.

Notably, the system and methods are not limited to calibrating barometric sensors or to obtaining barometric pressure measurements. Notably, the systems and methods may be utilized to calibrate any type of sensor, component, program, or any combination thereof, associated with a communication device. For example, the system and methods may be utilized to calibrate components 106, 115, which may be temperature sensors, proximity sensors, motion sensors, accelerometers, light sensors, gyroscopes, compasses, any type of sensor, or any combination thereof.

Figure 3:
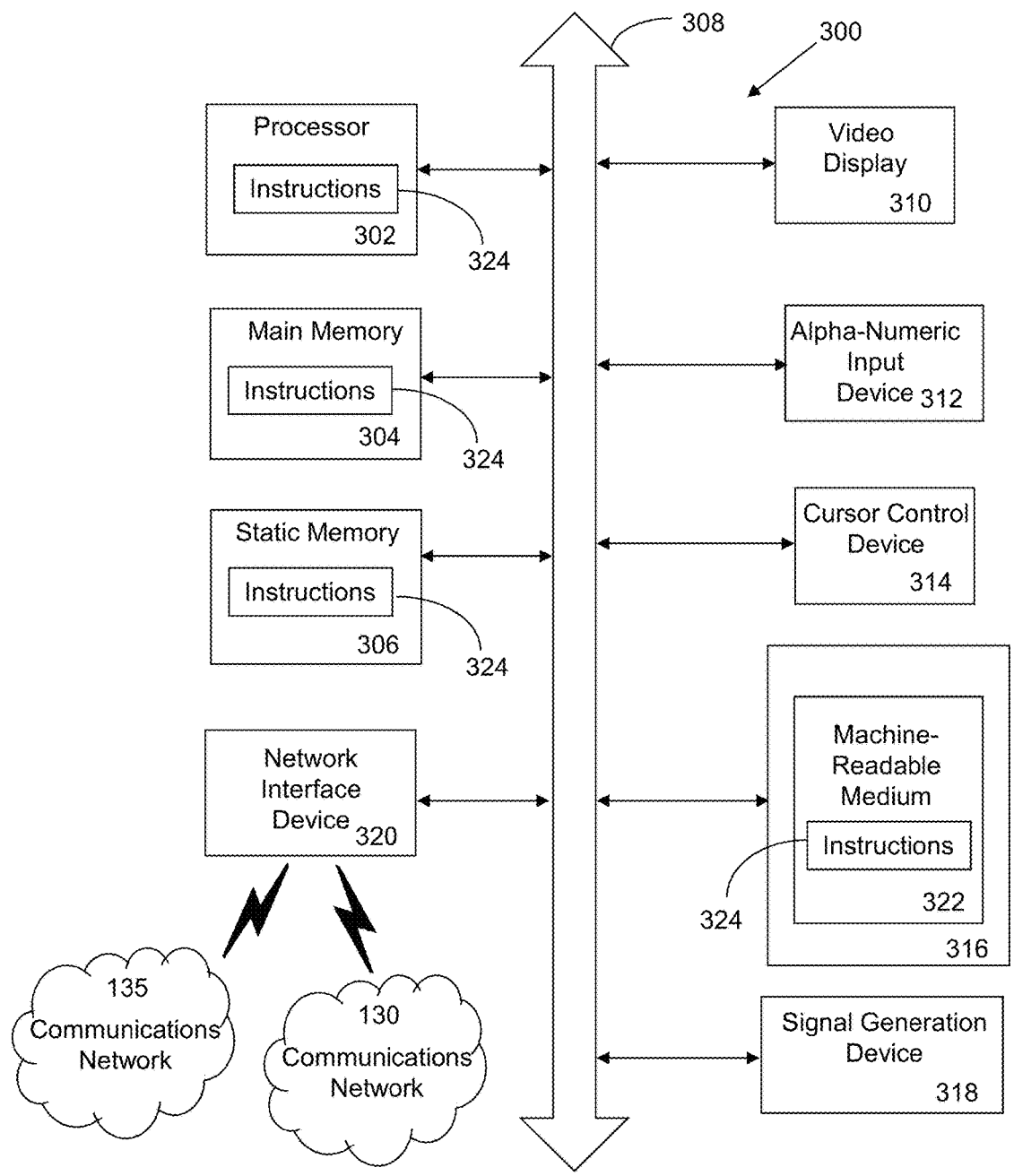
FIG. 3 is a schematic diagram of a machine in the form of a computer system within which a set of instructions, when executed, may cause the machine to perform any one or more of the methodologies or operations of the systems and methods for providing local barometric calibration for user equipment.

Referring now also to FIG. 3, at least a portion of the methodologies and techniques described with respect to the exemplary embodiments of the system 100 can incorporate a machine, such as, but not limited to, computer system 300, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 130, communications network 135, another network, or a combination thereof) to and assist with operations performed by other machines and systems, such as, but not limited to, the first user device 102, the second user device 111, the cell site 117, the wireless access point 118, the transmitter 120, the barometric pressure beacon 122, the local weather transmitter 125, the server 140, the server 145, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310, which may be, but is not limited to, a liquid crystal display (LCD), a flat panel, a solid state display, or a cathode ray tube (CRT). The computer system 300 may include an input device 312, such as, but not limited to, a keyboard, a cursor control device 314, such as, but not limited to, a mouse, a disk drive unit 316, a signal generation device 318, such as, but not limited to, a speaker or remote control, and a network interface device 320.

The disk drive unit 316 may include a machine-readable medium 322 on which is stored one or more sets of instructions 324, such as, but not limited to, software embodying any one or more of the methodologies or functions described herein, including those methods illustrated above. The instructions 324 may also reside, completely or at least partially, within the main memory 304, the static memory 306, or within the processor 302, or a combination thereof, during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 322 containing instructions 324 so that a device connected to the communications network 130, the communications network 135, another network, or a combination thereof, can send or receive voice, video or data, and to communicate over the communications network 130, the communications network 135, another network, or a combination thereof, using the instructions. The instructions 324 may further be transmitted or received over the communications network 130, the communications network 135, another network, or a combination thereof, via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A communication device, comprising:
   a memory that stores instructions; and
   a processor that executes the instructions to perform operations, the operations comprising:
      determining that a source is an optimal source for providing a barometric pressure measurement based on a proximity of the source to the communication device and based on a signal strength associated with the source;
      receiving, via an over-the-air signal provided by the source, the barometric pressure measurement corresponding to a location of the communication device;
      transmitting, to a sensor of the communication device, the barometric pressure measurement corresponding to the location of the communication device; and
      calibrating the sensor based on the barometric pressure measurement corresponding to the location of the communication device.

2. The communication device of claim 1, wherein the operations further comprise identifying a cell site identifier associated with a cell site connected to the communication device.

3. The communication device of claim 2, wherein the operations further comprise determining, based on the cell site identifier, the source for providing the barometric pressure measurement corresponding to the location of the communication device.

4. The communication device of claim 1, wherein the operations further comprise determining that the source is the optimal source for providing the barometric pressure measurement based on a processing power of the source.

5. The communication device of claim 1, wherein the operations further comprise determining that the source is the optimal source for providing the barometric pressure measurement based on whether the source is transmitting information to another communication device.

6. The communication device of claim 1, wherein the operations further comprise determining that the source is the optimal source for providing the barometric pressure measurement based on a load of the source.

7. The communication device of claim 1, wherein the operations further comprise determining that the source is the optimal source for providing the barometric pressure measurement based on a connection between the source and a communication network associated with the communication device.

8. The communication device of claim 1, wherein the operations further comprise determining altitude information of the communication device after calibrating the sensor.

9. The communication device of claim 8, wherein the operations further comprise tracking an object associated with the communication device based on the altitude information.

10. The communication device of claim 1, wherein the operations further comprise receiving a different over-the-air signal for calibrating a component of the communication device other than the sensor.

11. The communication device of claim 1, wherein the operations further comprise calibrating the sensor based on a selected time interval.

12. The communication device of claim 1, wherein the operations further comprise determining that the source is the optimal source for providing the barometric pressure measurement based on a storage capacity of the source.

13. The communication device of claim 1, wherein the operations further comprise recalibrating the sensor as the location of the communication device changes.

14. A non-transitory computer readable device comprising instructions, which, when executed by a processor, cause the processor to perform operations comprising:
- determining that a source is a preferred source for providing a barometric pressure measurement based on a proximity of the source to a communication device and based on a processing power of the source;
- receiving, via an over-the-air signal provided by the source, the barometric pressure measurement corresponding to a location of the communication device;
- providing, to a sensor of the communication device, the barometric pressure measurement corresponding to the location of the communication device; and
- calibrating the sensor based on the barometric pressure measurement corresponding to the location of the communication device.

15. The non-transitory computer readable device of claim 14, wherein the operations further comprise determining that the source is the preferred source for providing the barometric pressure measurement based on a signal strength associated with the source.

16. The non-transitory computer readable device of claim 14, wherein the operations further comprise calibrating the sensor when an application associated with the communication device is started.

17. The non-transitory computer readable device of claim 14, wherein the operations further comprise receiving a different over-the-air signal for calibrating a different component of the communication device.

18. The non-transitory computer readable device of claim 17, wherein the operations further comprise calibrating the different component of the communication device based on the different over-the-air signal.

19. The non-transitory computer readable device of claim 14, wherein the operations further comprise tracking an object associated with the communication device based on altitude information determined for the communication device.

20. A method, comprising:
- determining, by utilizing instructions from a memory that are executed by a processor, that a source is an preferred source for providing a barometric pressure measurement based on a proximity of the source to a communication device and based on a load of the source;
- receiving, via an over-the-air signal provided by the source, the barometric pressure measurement corresponding to a location of the communication device;
- providing, to a sensor of the communication device, the barometric pressure measurement corresponding to the location of the communication device; and
- calibrating the sensor based on the barometric pressure measurement corresponding to the location of the communication device.

* * * * *